(12) United States Patent
Minano et al.

(10) Patent No.: US 6,924,943 B2
(45) Date of Patent: Aug. 2, 2005

(54) ASYMMETRIC TIR LENSES PRODUCING OFF-AXIS BEAMS

(75) Inventors: Juan C. Minano, Madrid (ES); Waqidi Falicoff, Newport Beach, CA (US); Pablo Benitez, Madrid (ES); William A. Parkyn, Lomita, CA (US); Julio Pinto Chaves, Madrid (ES); Yupin Sun, Yorba Linda, CA (US)

(73) Assignee: Light Prescriptions Innovators, LLC, Irvine, CA (US)

( * ) Notice: Subject to any disclaimer, the term of this patent is extended or adjusted under 35 U.S.C. 154(b) by 0 days.

(21) Appl. No.: 10/622,874

(22) Filed: Jul. 18, 2003

(65) Prior Publication Data

US 2004/0105171 A1 Jun. 3, 2004

Related U.S. Application Data

(60) Provisional application No. 60/319,746, filed on Dec. 2, 2002.

(51) Int. Cl.⁷ .................................................. G02B 3/08
(52) U.S. Cl. ...................................... 359/720; 359/743
(58) Field of Search ................................ 359/720, 726, 359/727, 728, 741, 743, 641

(56) References Cited

U.S. PATENT DOCUMENTS

| | | |
|---|---|---|
| 1,977,689 A | 10/1934 | Muller |
| 2,254,961 A | 9/1941 | Harris ........................ 362/327 |
| 4,192,994 A | 3/1980 | Kastner |
| 4,337,759 A | 7/1982 | Popovich et al. |
| 4,342,908 A | 8/1982 | Henningsen et al. |
| 4,675,725 A | 6/1987 | Parkyn |
| 4,698,730 A | 10/1987 | Sakai et al. |
| 4,920,404 A | 4/1990 | Shrimali et al. |
| 5,140,220 A | 8/1992 | Hasegawa |
| 5,302,778 A | 4/1994 | Maurinus |
| 5,335,157 A | 8/1994 | Lyons |
| 5,404,282 A | 4/1995 | Klinke et al. |
| 5,404,869 A | 4/1995 | Parkyn, Jr. et al. |
| 5,452,190 A | 9/1995 | Priesemuth |
| 5,577,492 A | 11/1996 | Parkyn et al. |
| 5,608,290 A | 3/1997 | Hutchisson et al. |
| 5,613,769 A | 3/1997 | Parkyn et al. |
| 5,655,832 A | 8/1997 | Pelka et al. |
| 5,676,453 A | 10/1997 | Parkyn, Jr. et al. |
| 5,757,557 A | 5/1998 | Medvedev |
| 5,777,433 A | 7/1998 | Lester et al. |
| 5,806,955 A | 9/1998 | Parkyn, Jr. et al. |
| 5,813,743 A | 9/1998 | Naka |

(Continued)

FOREIGN PATENT DOCUMENTS

| | | |
|---|---|---|
| EP | 0450560 A2 | 10/1991 |
| WO | WO 99/09349 | 2/1999 |
| WO | WO 99/13266 | 3/1999 |
| WO | WO 01/07828 | 2/2001 |
| WO | WO 03/066374 A3 | 8/2003 |
| WO | WO 03/066374 A2 | 8/2003 |
| WO | WO 04/007241 A2 | 1/2004 |

OTHER PUBLICATIONS

Benitez, P. "Chapter 6: The SMS design method in three dimensions", from *Conceptos avanzados de óptica gnidólica: diseño y fabricación*, PhD dissertation, UPM, (1998).

(Continued)

*Primary Examiner*—Scott J. Sugarman
*Assistant Examiner*—Darryl J. Collins
(74) *Attorney, Agent, or Firm*—Thomas F. Lebens; Sinsheimer, Schiebelhut & Beggett

(57) ABSTRACT

The present invention relates to an improvement of a total internal reflection lens whereby a tilted symmetry axis leads to a net deflection of the output beam away from the surface normal of the exit surface. Linear TIR lenses have a net deflection transverse to their focal strip. Circular TIR lens profiles going beyond 90° are tilted to bring the rim level with the source, the deflected rays exiting the lens to form an off-axis beam.

24 Claims, 11 Drawing Sheets

U.S. PATENT DOCUMENTS

| | | | |
|---|---|---|---|
| 5,894,195 A | 4/1999 | McDermott | |
| 5,894,196 A | 4/1999 | McDermott | |
| 5,897,201 A | 4/1999 | Simon | |
| 5,898,267 A | 4/1999 | McDermott | |
| 5,924,788 A | 7/1999 | Parkyn | |
| 5,926,320 A | 7/1999 | Parkyn et al. | |
| 5,966,250 A | 10/1999 | Shimizu | |
| 6,030,099 A | 2/2000 | McDermott | |
| 6,044,196 A | 3/2000 | Winston et al. | |
| 6,048,083 A | 4/2000 | McDermott | |
| 6,166,860 A | 12/2000 | Medvedev et al. | |
| 6,166,866 A | 12/2000 | Kimura et al. | |
| 6,177,761 B1 | 1/2001 | Pelka | |
| 6,181,476 B1 | 1/2001 | Medvedev | |
| 6,268,963 B1 | 7/2001 | Akiyama | |
| 6,273,596 B1 | 8/2001 | Parkyn | |
| 6,282,821 B1 | 9/2001 | Freier | 40/564 |
| 6,301,064 B1 | 10/2001 | Araki et al. | |
| 6,450,661 B1 | 9/2002 | Okumura | |
| 6,473,554 B1 | 10/2002 | Pelka et al. | |
| 6,483,976 B2 | 11/2002 | Shie et al. | 385/133 |
| 6,536,923 B1 | 3/2003 | Merz | |
| 6,547,423 B2 | 4/2003 | Marshall et al. | |
| 6,560,038 B1 | 5/2003 | Parkyn et al. | |
| 6,578,989 B2 | 6/2003 | Osumi et al. | |
| 6,582,103 B1 | 6/2003 | Popovich et al. | |
| 6,598,998 B2 | 7/2003 | West et al. | |
| 6,603,243 B2 | 8/2003 | Parkyn et al. | |
| 6,607,286 B2 | 8/2003 | West et al. | |
| 6,616,287 B2 | 9/2003 | Sekita et al. | |
| 6,637,924 B2 | 10/2003 | Pelka et al. | |
| 6,639,733 B2 | 10/2003 | Minano et al. | |
| 6,646,813 B2 | 11/2003 | Falicoff | |
| 6,647,199 B1 | 11/2003 | Pelka et al. | |
| 6,674,096 B2 | 1/2004 | Sommers | |
| 6,688,758 B2 | 2/2004 | Thibault | 362/368 |
| 2002/0034012 A1 | 3/2002 | Santoro et al. | 359/599 |
| 2002/0080623 A1 | 6/2002 | Pashley | |
| 2003/0076034 A1 | 4/2003 | Marshall | |
| 2004/0070855 A1 | 4/2004 | Benitez | 359/858 |
| 2004/0105171 A1 | 6/2004 | Minano | 359/728 |
| 2004/0189933 A1 | 9/2004 | Sun | 351/177 |

OTHER PUBLICATIONS

Benitez, P.; Mohedano, R.; Minano, J. "Design in 3D geometry with the Simultaneous Multiple Surface design method of Nonimaging Optics" Instituto de Energia Solar, E.T.S.I. Telecomunicacion, Universidad Politecnica, 28040. Madrid, Spain. Jul. 1999.

International Search Report, PCT/US03/38240.

International Search Report, PCT/US03/32076, Apr. 20, 2004.

Remillard, Everson amd Weber, "Loss Mechanisms Optical Light Pipes" *Applied Optics* vol. 31 # pp. 7232–7241 Dec. 1992.

Parkyn et al The Black Hole™: Cuspated waveguide–injectors and illuminators for LEDs; Part of the SPIE Conference on Nonimaging Optics: Maximum efficiency Light Transfer V, Denver, CO, Jul. 1999.

Hyper ARGUS®LED, Hyper–Bright, 3mm (T1) LED, Non Diffused; Mar. 1, 2000; Infineon Technologies, pp. 1–9.

Spigulis "Compact dielectric reflective elements, Half–sphere concentrators of radially emitted light" *Applied Optics* vol. 33, No. 25, Sep. 1994.

ASYMMETRIC TIR LENSES PRODUCING OFF-AXIS BEAMS

CROSS REFERENCE TO RELATED APPLICATIONS

This application claims priority to Provisional Application No. 60/319,746 of Minano et al., for ASYMMETRIC TIR LENSES PRODUCING OFF-AXIS BEAMS, filed Dec. 2, 2002 and is herein incorporated by reference.

BACKGROUND OF INVENTION

The present embodiment improves upon three previous approaches: two of which are set forth in U.S. Pat. Nos. 5,404,869 and 5,676,453, both by Parkyn & Pelka, being continuations in part of the first, U.S. Pat. No. 4,337,759 by Popovich, Parkyn, & Pelka, which are herein Incorporated by reference. These patents describe Totally Internally Reflecting (TIR) lenses with circular, toroidal, or cylindrical symmetry that produce output beams normal to an exterior surface.

The prior devices disclosed in U.S. Pat. Nos. 5,404,869, 5,676,453, and 4,337,759, Incorporated herein by reference, have outputs that are inherently aligned with a system axis of symmetry. Previously, slanted beams required an external means, typically auxiliary external faceting, which has the disadvantages of dust collection, increased device thickness, non-conformity with any adjoining exterior surface, and lost lens efficiency.

SUMMARY OF INVENTION

The present invention advantageously addresses the needs above as well as other needs by providing variations of a plurality of totally internally reflecting lenses which produce off-axis beams through a smooth surface. The present embodiment is a system generally comprising a radiant energy transmitting body means, an asymmetric transparent lens that employs a precise internal faceting design, and a smooth external surface.

In one embodiment, for example, a lens utilizes total internal reflection (TIR) in conjunction with refraction in order to efficiently gather and redirect electromagnetic radiation into a desired off-axis solid angle, e.g. off normal to the exterior surface. The embodiment described above comprises left and right deflecting halves and an asymmetric internal facet structure, wherein each internal facet is individually tilted. In another embodiment, a lens having a rim angle greater than 90° efficiently gathers and redirects electromagnetic radiation into an off-axis angle by means of a bilaterally asymmetrical TIR lens wherein both lateral surfaces and internal facet structure are slanted at an angle away from the exterior surface normal. In yet another embodiment, a lens efficiently gathers and redirects electromagnetic radiation into an off-axis angle by way of a circular TIR lens comprising a rim angle greater than 90°, rings of facets, and a tilted lens profile such that a horizontal view of the lens would reveal a bilaterally asymmetrical TIR lens. In any configuration, the lens of the present embodiment has a smooth exterior surface and is capable of emitting a beam that is significantly off-axis. The described examples have substantial benefits over prior-art lenses, including a great range of applications wherever illumination lenses must be conformal with a smooth surface and yet still produce off-axis output beams aimed at a particular target zone or in a particular set of directions away from surface normal.

BRIEF DESCRIPTION OF DRAWINGS

The above and other aspects, features and advantages of the present invention will be readily apparent from the following more particular descriptions thereof, presented in conjunction with the following drawings wherein.

Corresponding reference characters indicate corresponding components throughout the several views of the drawings.

DETAILED DESCRIPTION

Figure 1:
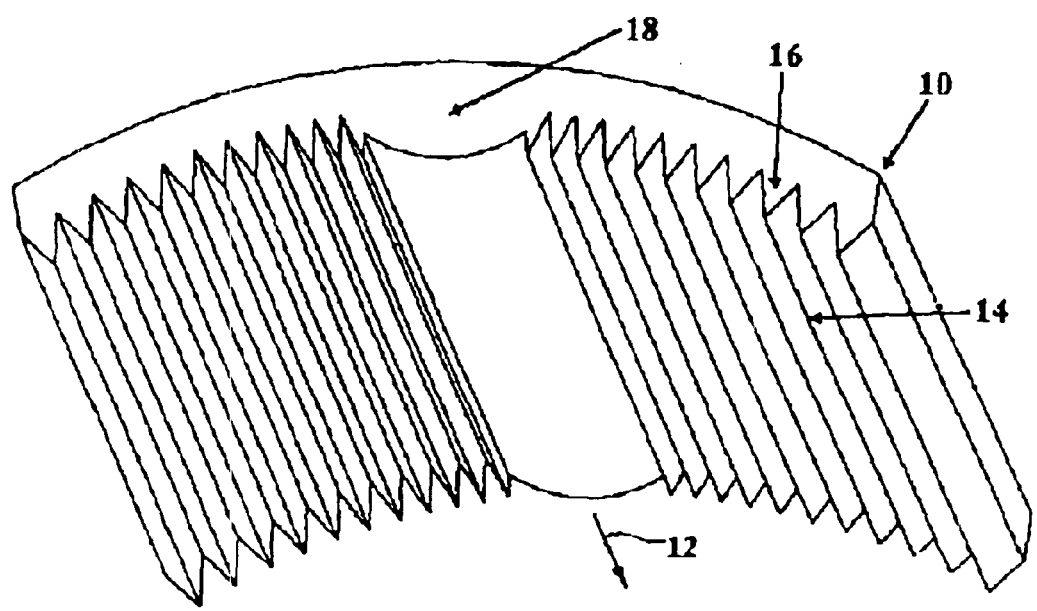
FIG. 1 is a perspective view of a linear TIR lens.

The following description of the presently contemplated best mode of practicing the invention is not to be taken in a limiting sense, but is made merely for the purpose of describing the general principles of the invention. The scope of the invention should be determined with reference to the claims.

The problem addressed by the present embodiment is how to produce an off-axis beam with a TIR lens while retaining a smooth exterior surface and without the requirement of a second lens. The present embodiment overcomes the limitations of the prior art lenses, which cannot deliver an off-axis beam without the installation of additional deflection means or additional lenses on their surfaces. This external auxiliary deflector limits the range of applications of the TIR lens.

The output beam of a TIR lens will generally share its symmetry. Most pertinent to the present embodiment, TIR lenses with a smooth exterior surface will typically emit beams centered about the normal to that surface. Slanted output beams require additional deflection means, such as linear refractive facets, to be installed on the external surface.

External Fresnel faceting in the form of linear grooves will deflect light towards their upward slope. As deflections approach a practical limit of 30° (for the typical refractive index in the range 1.4–1.7), the finite size of the light source increases the risk of internal reflection trapping light within the lens body. Unlike with the teachings of the present embodiment, deflections greater than 30° are completely unattainable by a single refraction.

The present embodiment generally comprises an asymmetric transparent lens that employs a precise internal faceting design. This lens utilizes total internal reflectance (TIR) in conjunction with refraction In order to concentrate and redirect electromagnetic radiation at a desired deflected angle from exterior surface normal (i.e. off-axis). Radiant energy (i.e. light) is redirected to or from a predetermined zone or zones wherein such redirection has a predetermined degree of concentration.

The lens of the present embodiment has a smooth exterior surface and is capable of emitting a beam that is significantly off-axis, e.g. off normal to the exterior surface. This has substantial benefits over prior art lenses, including a great range of applications wherever lenses must be conformal with a smooth surface and yet still produce off-axis output beams aimed at a particular target zone or in a particular direction away from surface normal. Examples are automotive and aircraft lighting that must be flush to a curved surface. The lens of the present embodiment can be adapted to such curvature by compensating alterations in the local deflections produced at each exit point, resulting in the same beam as would be produced by an uncurved lens.

In order to meet this need for conformal off-axis TIR lenses, the present embodiment applies a fundamental tilt to either individual facets or to the lens's symmetry as a whole, and/or by increasing the rim angle above 90 degrees (90°) by virtue of a precise geometrical design of the outermost facet. These features yield significant improvement by offering the versatile new capability of off-axis beams from a TIR lens with a smooth exterior surface.

The present embodiment can be subdivided into three types of interior-faceted lenses (herein Type I, Type II and Type II, respectively), two of them cylindrical (having linear symmetry), and one circular (having off-axis rotational symmetry). All three types produce a well-formed beam exhibiting a substantial deflection angle from the surface-normal of its exterior, the exterior being advantageously unfaceted. The slant of the output beam is primarily due to the interior tilt of the facets, which are either tilted individually or tilted via a tilt of the system axis. This facet tilt angle $\theta_1$ is within the medium of the lens, so that Snell's law will amplify it into an even greater external deflection angle $\theta_2$ in accordance with the formula, $\theta_2 = \sin^{-1}((n_1/n_2) * \sin \theta_1)$ where $n_1$=index of refraction of the lens material and $n_2$=index of refraction of the exterior medium (air, $n_2$=1). For example, a 30° lens tilt with an $n_1/n_2$ ratio of 1.5 will generate about a 49° deflection of the output beam. The output beam will be somewhat broadened in the plane of the deflection, also in accordance with Snell's law, making it slightly elliptical. The most common optical plastic is acrylic, with n=1.492, while the tougher polycarbonate has n=1.592, and the automotive-lens material ABS has n=1.54.

With Type I lenses, deflection up to 30° is easily attainable. With Type II/III lenses, deflections of 45° are easily attainable while still retaining beam fidelity, and deflections up to 60° are possible. Attempts at high deflections (60° or more) risk trapping some of the light by unwanted total internal reflection at the external surface, especially with a linear TIR lens, where most of the flux from the source is out of plane. However, a 60° deflection angle is roughly twice those attainable through refraction by the external Fresnel faceting required in the prior art.

The Type I asymmetrical TIR lens is a linear lens formed by combining half of a converging TIR lens (i.e. a first half f the lower surface of the TIR lens) with half of a diverging TIR lens (i.e. a second half of the lower surface of the TIR lens). All the facets on each half have the same output angle, so their rays are parallel (i.e., off-axis collimation). As the tilt angle increases, however, this approach can lead to a split-level lens because the two sides have different profile heights.

For output beams with larger deflection angles, e.g. deflection angles greater than about 30°, an approach is needed to avoid this split-profile effect. The Type II asymmetrical TIR lens does not require such a split profile. Instead, a bilaterally symmetric TIR lens profile is tilted in its entirety, utilizing a rim angle that goes beyond the 90° typical of most TIR lenses.

The angle subtended between the focal point (the point where a light source is most advantageously placed) and the outermost internal facet is known as the "rim angle." Most lenses have a rim angle of 90° because this angle minimizes lens thickness.

TIR lenses with a trans-90° rim angle are made in accordance with the Type II cylindrical TIR lens of the present embodiment using materials of higher refractive index (e.g. polycarbonate 1.59), with the lens profile being sliced horizontally and some facets removed to leave an asymmetric lens profile. The tilted beam from this profile is then further deflected when refracted by the external, unfaceted surface of the lens. Using this design, bend angles of 45° are possible with no loss in beam fidelity.

With these linear versions of the above-described embodiment (i.e., Types I and II), anamorphic lenses are formed by adding external cylindrical features running perpendicular to the interior lens facets. That is, a flat outer surface is altered to form transversely running convex protuberances with refractive power. In the situation of a continuous linear source such as a tubular fluorescent or neon lamp, it is not possible to narrow its Lambertian pattern in the directions parallel to that of the facets. Hence external features can do no good. But when the illumination source is a series of separated compact sources, such as LEDs, external cylindrical lenses can be centered upon them in order to increase the output candlepower by redirecting light from high sagittal angles to low ones.

The Type III asymmetrical TIR lens has the same tilted-profile concept as does the just-mentioned Type II linear lens, but starting with a circularly symmetric lens having a rim angle past 90°. Although circularly symmetric, a horizontal view of the lens would reveal a bilaterally asymmetrical TIR lens profile. This profile is tilted and cut by a horizontal plane through the source. Via refraction of this slanted beam passing through the external surface, this lens forms a collimated beam slanted well away from the surface normal.

The smooth exterior surface of the present embodiment enables luminaires to be conformal (i.e., substantially continuous with and parallel to) with a surface, such as the body of a vehicle, while emitting well-formed beams at large angles (easily up to 45°) to the surface normal.

The compactness of TIR lenses enables this innovation to be quite applicable to the next generation high-powered light-emitting diodes (LEDs). In general, a TIR lens can be added onto a source, such as an LED, thereby greatly increasing its luminous directivity and utility.

An array of lenses such as those in the embodiments described above can be used in coordination to synthesize and concentrate radiant energy beams from LEDs. Each LED could be individually outfitted with a lens, and relatively narrow output beams could be synthesized and concentrated by being tilted at varying directions from the surface normal, thereby increasing candlepower.

The ability to emit off-axis beams is of great significance for all types of lighting. A recessed reading lamp or accent light could provide illumination well to the side of its position. In vehicular lighting, its thin profile enables the lens to be mounted directly on a vehicle's skin without having to cut expensive mounting holes required by conventional reflectors. Styling considerations may situate taillights or running lights on surfaces slanted appreciably away from rear-facing, the direction where their beams need to go. The exterior surfaces of these lights must be conformal with the vehicle shape, be equally smooth, and direct the beams in the proper rear direction. The ability of the present embodiment to produce large-angle off-axis beams allows vehicle lights to be conformal to the shape of the vehicle, as its large deflection capability (over 45°) enables an array to conform to surface curvature, and by having a distribution of coordinated output-beam deflections to produce a concentrated beam.

Referring first to FIG. 1, a perspective view of a linear TIR lens 10 is shown. Shown are a linear TIR lens 10, a symmetry axis 12, faceted triangular grooves 14, totally Internally reflecting facets 16, and a refractive central cylindrical lens 18.

The linear TIR lens 10 consists of totally internally reflecting facets 16 on either side of a refractive central lens 18, which lies along the symmetry axis 12. Between the totally internally reflecting facets 16 are faceted triangular grooves 14. In a functioning linear TIR lens 10, all of the output from a light source is directed to the totally internally reflecting facets 16 where an output beam of light is emitted along the symmetry of axis 12.

Figure 2:
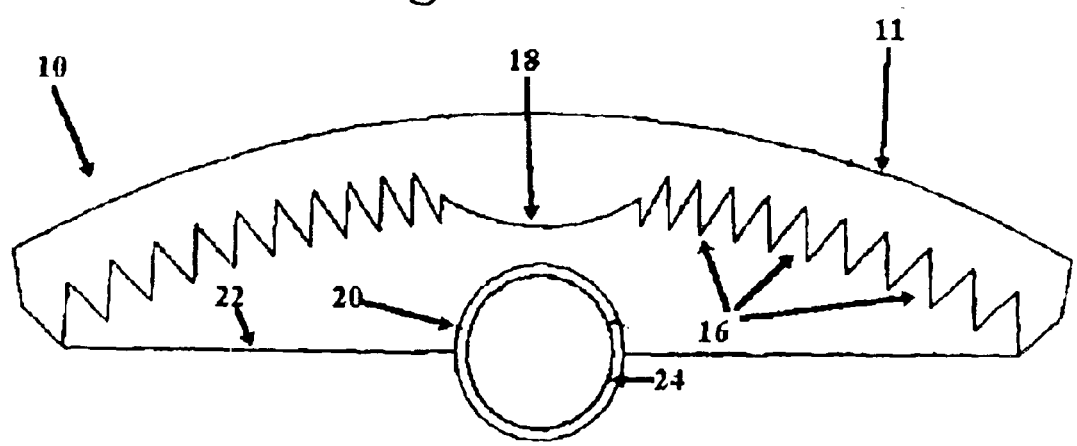
FIG. 2 is a cross-section of the lens from FIG. 1.

Referring next to FIG. 2, a cross-section of the linear TIR lens from FIG. 1 is depicted. Shown are the linear TIR lens 10, a smooth exterior surface 11, totally internally reflecting facets 16, refractive central lens 18, a cylindrical light source 20, a planar mirror 22, and a cylindrical reflector 24.

The linear TIR lens 10 consists of a refractive central lens 18 with totally internally reflecting facets 16 on either side. Located behind the refractive central lens 18 is a cylindrical light source 20 which is partially surrounded by a cylindrical reflector 24. A planar mirror 22 is located behind the length of the linear TIR lens 10. In the shown linear TIR lens 10, a cylindrical light source 20 emits light which is reflected by the cylindrical reflector 24 and a planar mirror 22 towards the refractive central lens 18 and totally internally reflecting facets 16 where an output beam of light is emitted through the smooth exterior surface 11.

Figure 3:
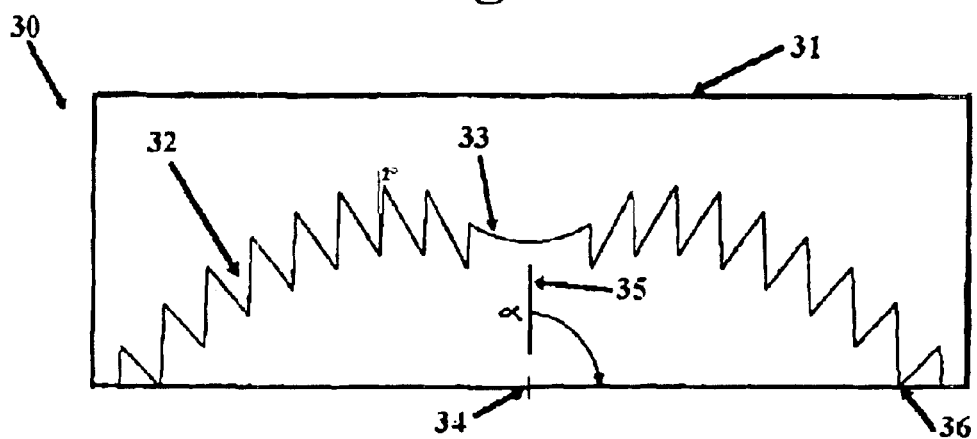
FIG. 3 is a cross-section of a flat exterior-surfaced, bilaterally symmetrical TIR lens showing rim angle $\alpha$.

Referring next to FIG. 3, a linear TIR lens with a flat exterior surface is shown. Shown are the flat surface linear TIR lens 30, the flat exterior surface 31, TIR facets 32, a central lens 33, a source 34, a rim angle α relative to central axis 35, and planar reflector 36.

The flat topped TIR lens 30 consists of TIR facets 32 on either side of a refractive central lens 33. At the rear of the flat surface TIR lens 30 is a source 34 and planar reflector 36. Rim angle α is measured at source 34 and ranges from 0° on the axis 35 to 90° where the lens meets planar reflector 36. Although total internal reflection allows greater rim angles, especially with materials of higher refractive index (e.g. polycarbonate 1.59), lens thickness is at least at the 90° value.

Figure 4:
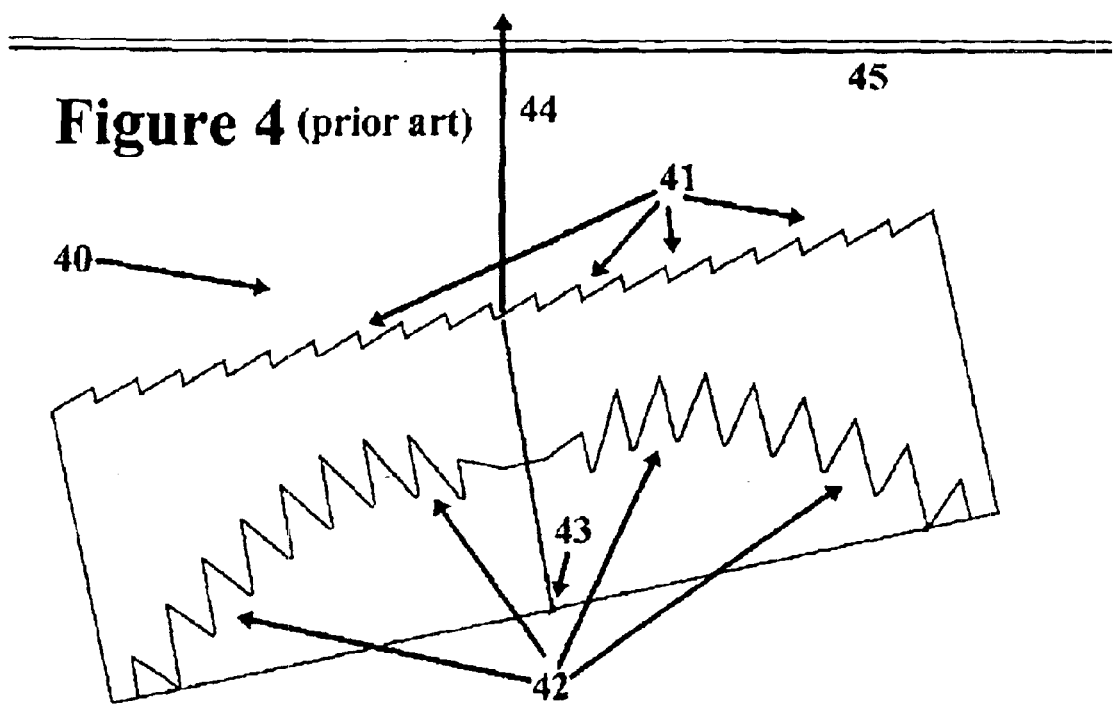
FIG. 4 is a cross-section of a flat exterior-surfaced, bilaterally symmetrical TIR lens with external linear refractive facets installed to produce an off-axis beam (this represents the previously known method of generating off-axis beams, which requires a non-smooth exterior on a prior-art TIR lens)

Referring next to FIG. 4, a cross-sectional view of a bilaterally symmetric TIR lens is shown. Shown are a bilaterally symmetric TIR lens 40, exterior linear faceting 41, circularly symmetric interior faceting 42, a source 43, a deflected central ray 44, and a lens cover 45.

The bilaterally symmetric TIR lens 40 comprises circularly symmetric interior faceting 42 in front of and on either side of a source 43. Instead of a smooth surface, the bilaterally symmetric TIR lens 40 has a rough top consisting of exterior linear faceting 41 from which comes deflected central ray. The lens cover 45 is oriented in such a way that central ray 44 will hit it perpendicularly.

Circularly symmetric lenses cannot deliver off-axis beams by themselves. The bilaterally symmetric TIR lens 40 is shown tilted, which can happen due to design constraints. The bilaterally symmetric TIR lens 40 comprises the circularly symmetric interior faceting 42 collimating light onto exterior linear faceting 41 extending in and out of the plane of the figure. The exterior linear facets 41 act to deflect light, such as exemplary central ray 44, to overcome the tilt of the lens and strike lens cover 45 in a perpendicular fashion.

Figure 5:
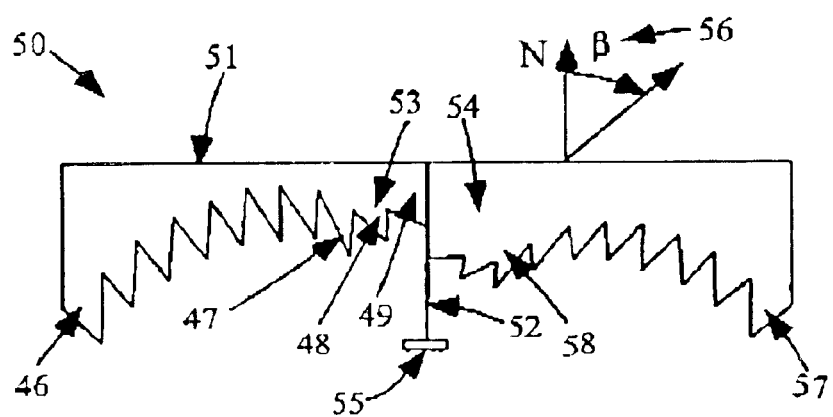
FIG. 5 shows a Type I bilaterally asymmetrical off-axis TIR lens, with right and left halves both deflecting light rightwards through deflection angle $\beta$.

Referring next to FIG. 5, a Type I Off-axis TIR lens is shown. Shown are an asymmetric lens 50, a flat exterior surface 51, a central axis 52, a left half-lens 53, left-half linear TIR facets 46, 47, left-half refractive facets 48, 49, a right half-lens 54, right-half linear TIR facets 57 and 58, source 55, and emitted beam angle β 56.

The asymmetric lens 50 features the flat exterior surface 51, the central axis 52 separating the left half-lens 53 and the right half-lens 54. The source 55 lies along the central axis 52 and between and behind the left-half lens 53 and the right-half lens 54. The left-half lens 53 is comprised of the left-half linear TIR facets 46, 47, and the left-half refractive facets 48, 49. The right-half lens 54 is comprised of right-half linear TIR facets 57, 58. The desired emitted beam is deflected at angle β 56.

The desired output-beam deflection is indicated by angle β 56 which is deflected from surface normal vector N on the flat exterior surface 51. The left half-lens 53 is defined by its output beam crossing the central axis 52, while the right half-lens 54 deflects light away from the central axis 52. The left-half-lens 53 consists of left-half linear TIR facets 46 to 47 and left-half refractive facets 48 and 49, spanning the full range of source angle α=90° to 0° (the latter is parallel to surface normal vector N).

Figure 6:
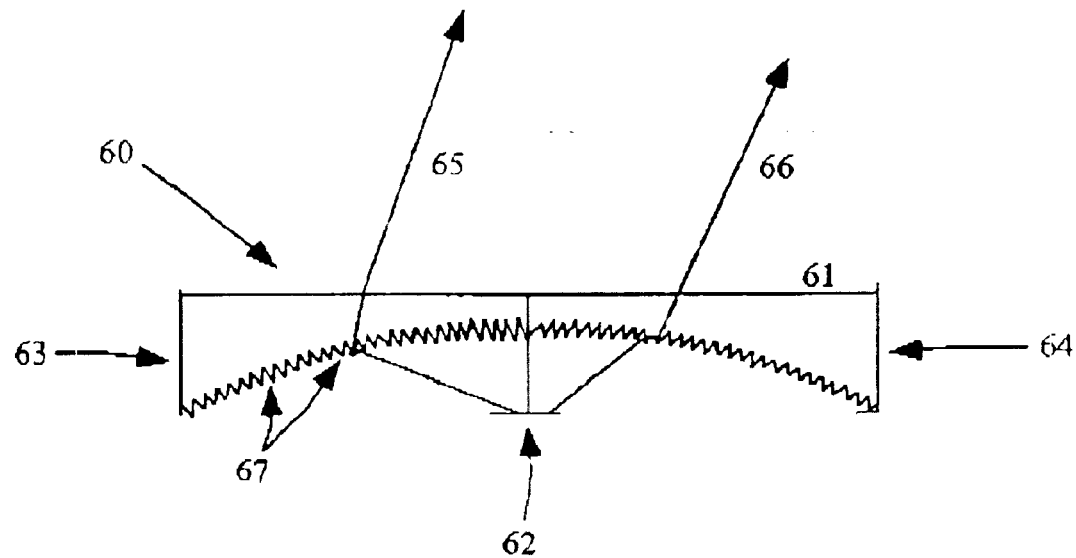
FIG. 6 shows another Type I off-axis TIR lens, but with a different facet design than In FIG. 5.

Referring next to FIG. 6, another Type I Off-Axis TIR lens is shown. Shown are a Type I Off-Axis TIR lens 60, a smooth exterior surface 61, an LED-strip source 62, a left-lens 63, a right-lens 64, an output ray 65, an output ray 66, and internal TIR faceting 67.

The Type I off-axis TIR lens 60 features a left lens 63 flush to a right lens 64, and a smooth exterior surface 61. An LED-strip source 62 lies behind the contact point of the left lens 63 and the right lens 64. Both the left lens 63 and the right lens 64 contain internal TIR faceting 67 from which output rays 65 and 66 are emitted.

When light shines from the LED-strip source 62, the internal TIR faceting 67 of the left lens 63 and the right lens 64, exploits Its large bend-angle capability to deliver rays 65 and 66 through the smooth exterior surface 61 into the right half-field of direction.

Figure 7:
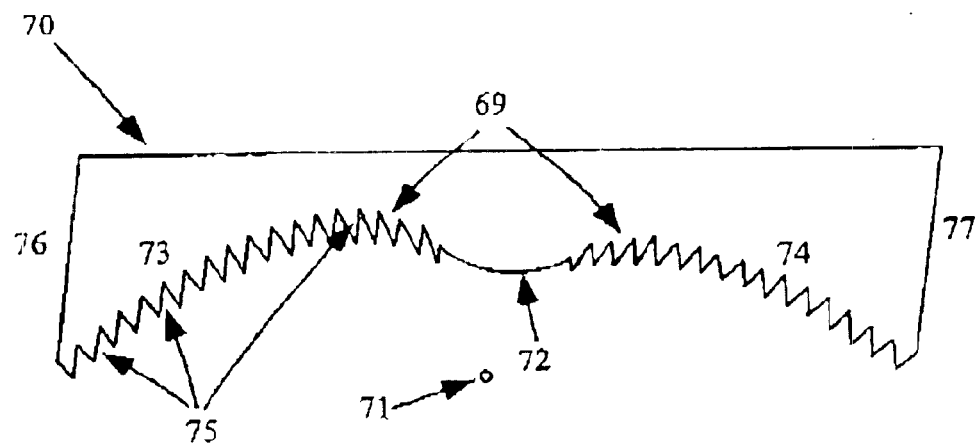
FIG. 7 shows a cross section of a linear asymmetric Type I TIR lens producing a 10° beam deflection, including a central refractive lens.

Referring next to FIG. 7, a cross-section of a linear asymmetric Type I TIR lens capable of producing a 10° off-axis beam is shown. Shown are facets 69, a linear asymmetric Type I TIR lens 70, a focal point 71, a refractive central lens 72, a left half-lens 73, a right half-lens 74, entry faces 75, a tilted lateral surface 76, and a tilted lateral surface 77. The focal point 71 is the location for a generating means, preferably an LED, but alternatively a compact incandescent source or linear fluorescent lamp. The central refractive lens 72 lies between the left half-lens 73 and the right half-lens 74. The entry faces 75 are tilted inwards more than the usual minimum draft angle (such as the 2° entry-face angle shown in FIG. 3). Their tilt Is equal to that of lateral surfaces 76 and 77, and Is determined by applying Snell's law to the 10° exterior angle of the output beam. For example, at refractive index 1.5, this exterior angle β=10° corresponds to interior angle $\beta''=\sin^{-1}[(\sin 10°)/1.5]=6.6°$.

Figure 7A:
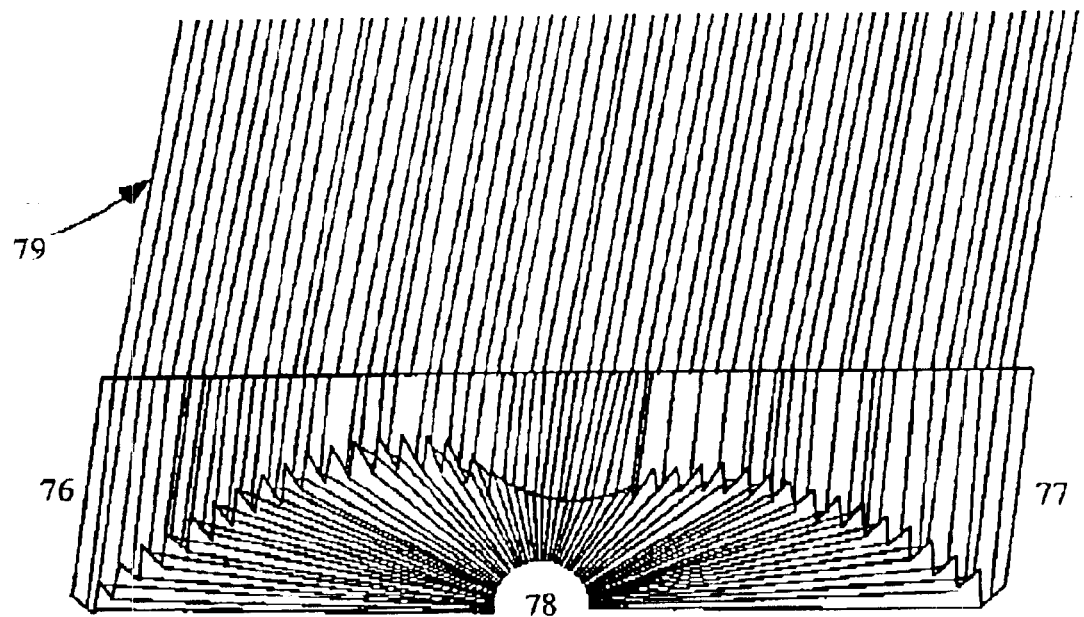
FIG. 7a is a ray trace of the linear asymmetric Type I TIR lens of FIG. 7.

Referring next to FIG. 7a, a ray trace through the lens of FIG. 7 is shown. Shown are totally internally reflecting facets 69 (for clarity, labeled only in FIG. 7), a left lateral surface 76, a right lateral surface 77, a ray fan 78, and a deflected beam 79.

Shown in the ray trace, the ray fan 78 lies centrally and behind totally internally reflecting facets 75 which are flanked on either side by the left lateral surface 76 and the right lateral surface 77. The deflected beam 79 is emitted from faces of the totally internally reflecting facets 69.

In the ray trace, the ray fan 78 strikes reflective faces of the totally internally reflecting facets 69, which are situated between the left lateral surface 76 and the right lateral surface 77. From the reflective face, ray fan 78 becomes deflected beam 79. The left lateral surface 76 and the right lateral surface 77 are parallel to the ray paths within the lens body.

Figure 8:
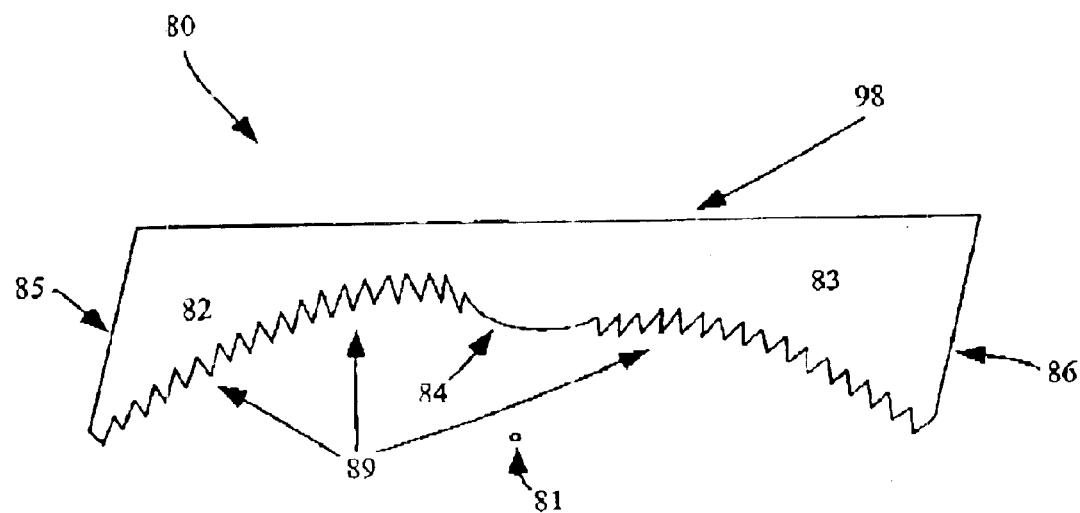
FIG. 8 shows a cross-section of a linear asymmetric TIR lens producing a 20° beam deflection.

Referring next to FIG. 8, a cross-sectional view of an asymmetric linear TIR lens capable of producing an output beam with 20° deflection is shown. Shown are an asymmetric linear TIR lens 80, a focal point 81, left half-lens 82, a right half-lens 83, a central lens 84, TIR facets 89, a flat top surface 98, a left lateral surface 85, and a right lateral surface 86.

The asymmetric linear TIR lens 80 is comprised of the left half-lens 82 and the right half-lens 83, with TIR facets 89 on either side of the central lens 84 and the focal point 81, where a light source means such as an LED is situated. Flanking the left half-lens 82 is the left lateral surface 85 and flanking the right half-lens 83 is the right lateral surface 86. The lateral surfaces 85 and 86 are tilted at the Snell's law angle of $\sin^{-1} (\sin 20°)/1.5=13.2°$, by which top surface 98 produces an output beam angle of 20°.

Figure 8A:
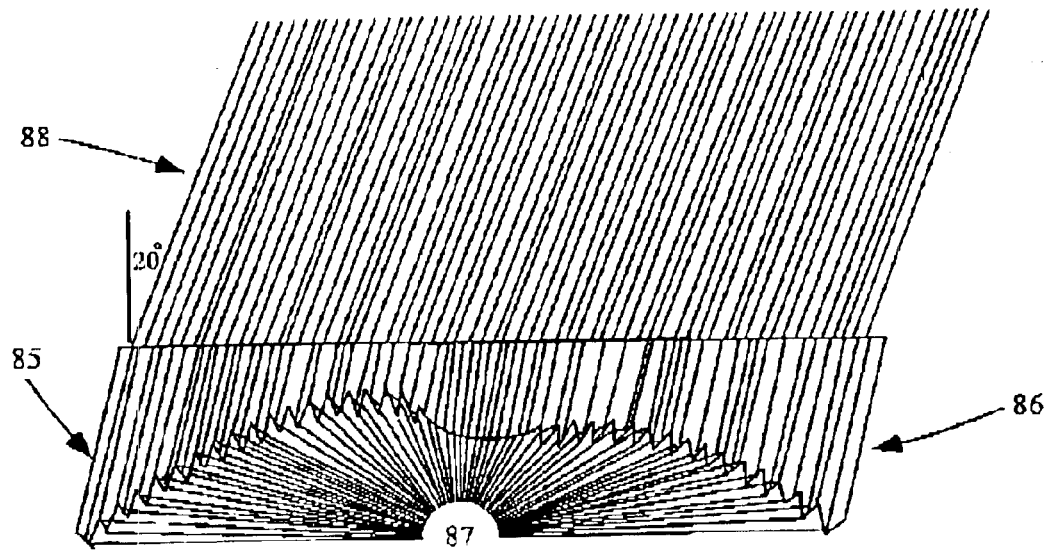
FIG. 8a is a ray trace of the linear asymmetric TIR lens of FIG. 8.

Referring next to FIG. 8a, a ray trace through the lens of FIG. 8 is shown. Shown are lateral surface 85, lateral surface 86, ray fan 87, and output beam 88.

Shown in the ray trace, ray fan 87 propagates through totally internally reflecting facets 89 (for clarity, labeled only in FIG. 8) which are flanked on either side by the left lateral surface 85 and the right lateral surface 86. The deflected beam 88 is emitted from the flat top surface 98 (for clarity, labeled only in FIG. 8).

In the ray trace, the ray fan 87 strikes reflective faces of the totally internally reflecting facets 89 which are situated on either side of central cylindrical lens 84 (for clarity, labeled only in FIG. 8) and between the left lateral surface 85 and the right lateral surface 86. From the reflective face, the ray fan 87 becomes the deflected beam 88. The ray fan 87 is transformed into 20°-deflected output beam 88.

Figure 9:
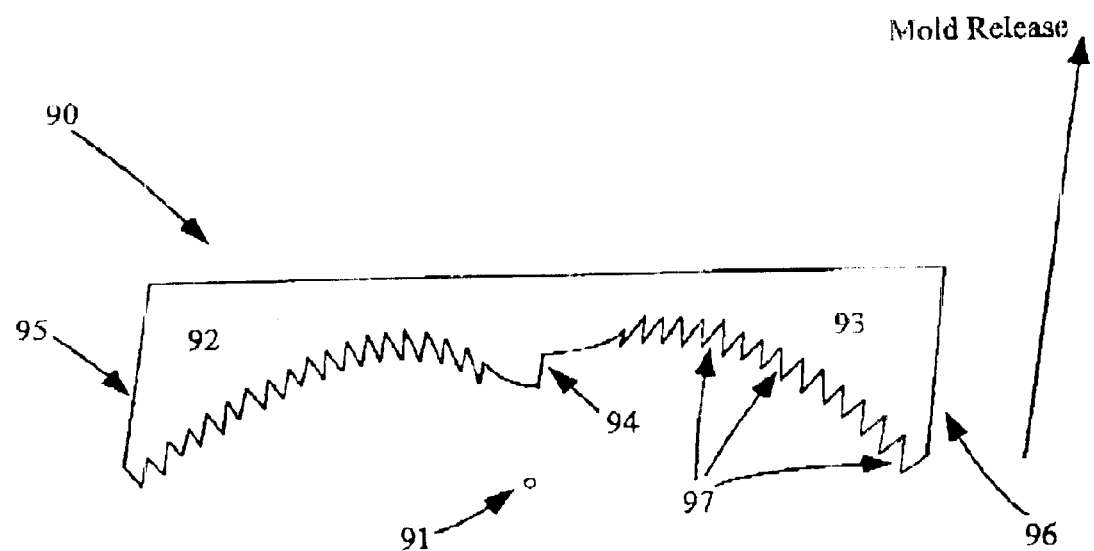
FIG. 9 shows a cross-section of a linear asymmetric TIR lens producing a 20° beam deflection, including negative draft angles in the right half of the lens, leading to a much more split-level profile than the lens in FIG. 6.

Referring next to FIG. 9, a 20° Type I Off-Axis TIR lens with negative draft is shown. Shown are a Type I Off-Axis TIR lens 90, focal point 91, a left half-lens 92, a right half-lens 93, a central lens 94, a lateral surface 95, a lateral surface 96, and negative-draft faceting 97.

The Type I Off-Axis TIR lens 90 has the focal point 91 and comprises the left half-lens 92 (identical to the left-half lens 82 of FIG. 8), the right half-lens 93 with negative-draft faceting 97, the left lateral surface 95 and the right lateral surface 96 at an angle of 13.2° in accordance with Snell's Law, and the central lens 94 having a negative-draft "cliff" to accommodate the different profile heights of the two half-lenses. The right half-lens 93 has a negative draft angle, 13.2°, the same magnitude as the positive-draft entry faces of left half-lens 92. For an unjammed mold release, a non-orthogonal mold-release direction is shown. This slanted direction is standard practice in the molding industry for parts such as this one having internal surfaces that would prevent the customary orthogonal direction for extracting a molded part.

Figure 10:
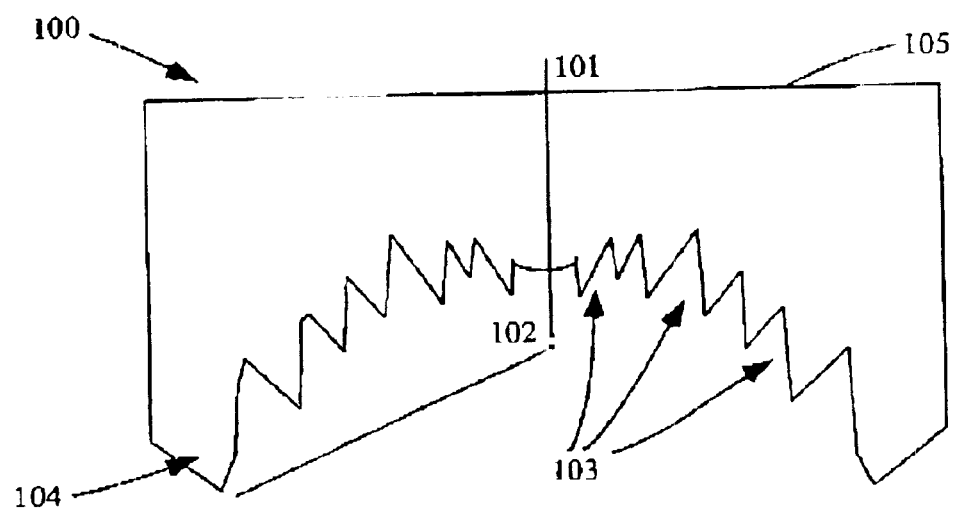
FIG. 10 is a cross-section of a circularly symmetric Type II TIR lens with rim angle beyond 90°.

Referring next to FIG. 10, a circularly symmetric off-axis TIR lens is shown. Shown are a circularly symmetric off-axis TIR lens 100, a system-axis 101, a focal point 102, interior faceting 103, an outermost facet 104, and an exterior surface 105.

The circularly symmetric off-axis TIR lens 100 is comprised of two outermost facets 104, fashioned with a Cartesian-oval entry face, each flanking the interior faceting 103. The focal point 102 lies along the center axis of the interior faceting 103.

The circularly symmetric Off-Axis TIR lens 100 is unconventional in that it collects rays beyond 90° from the system axis 101. For output beams with larger deflection angles, this approach is needed to avoid this split-profile effect. The angle subtended at focal point 102 is the rim angle. Usually such an over −90° condition Is unnecessary, because a minimum lens thickness is achieved at 90°, as exemplified by the TIR lens profile of FIG. 3. The interior faceting 103 comprises facets of different widths. The exterior surface 105 is also shown as flat, but convex or concave figuring is possible for final shaping of the output beam.

Figure 10A:
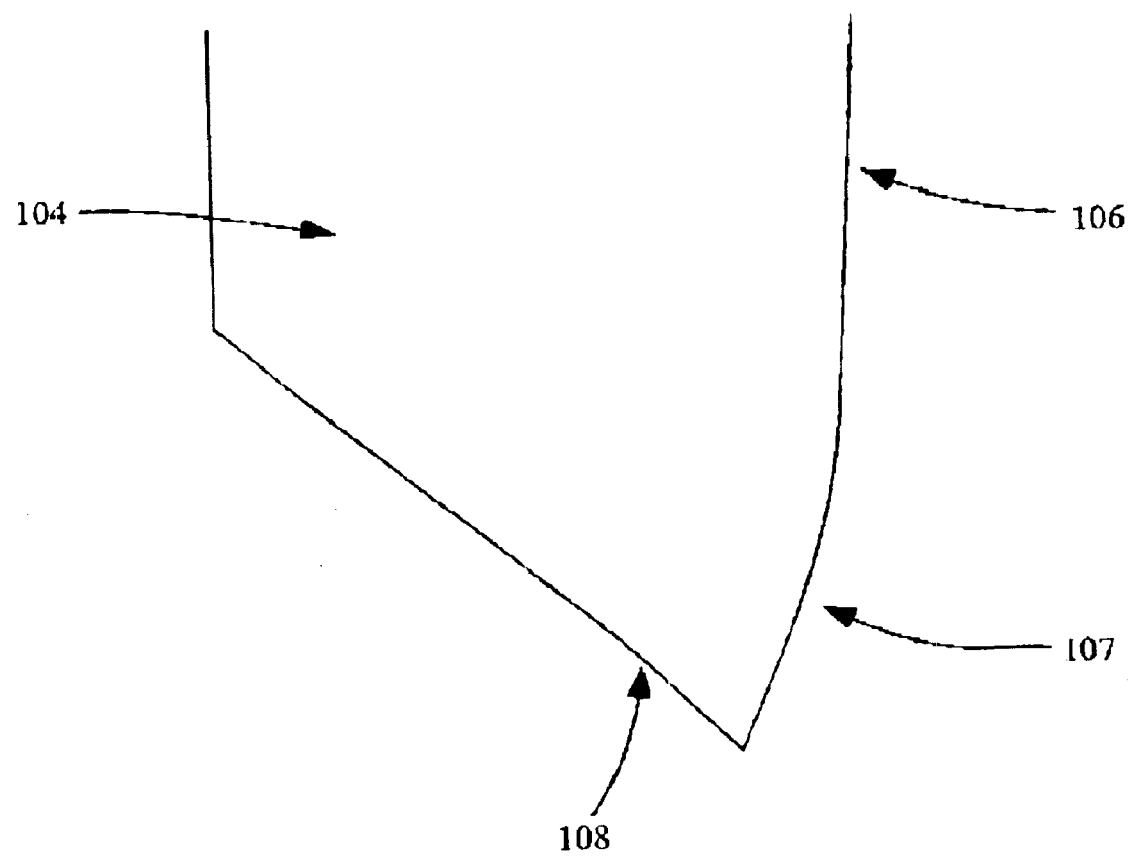
FIG. 10a Is a close-up of the outermost facet of the TIR lens of FIG. 10.

Referring next t FIG. 10a, a close-up of the outermost facet 104 is shown. Shown are the outermost facet 104, a draft-angle face 106, Cartesian-oval entry face 107, and a total Internal reflection face 108.

Figure 10B:
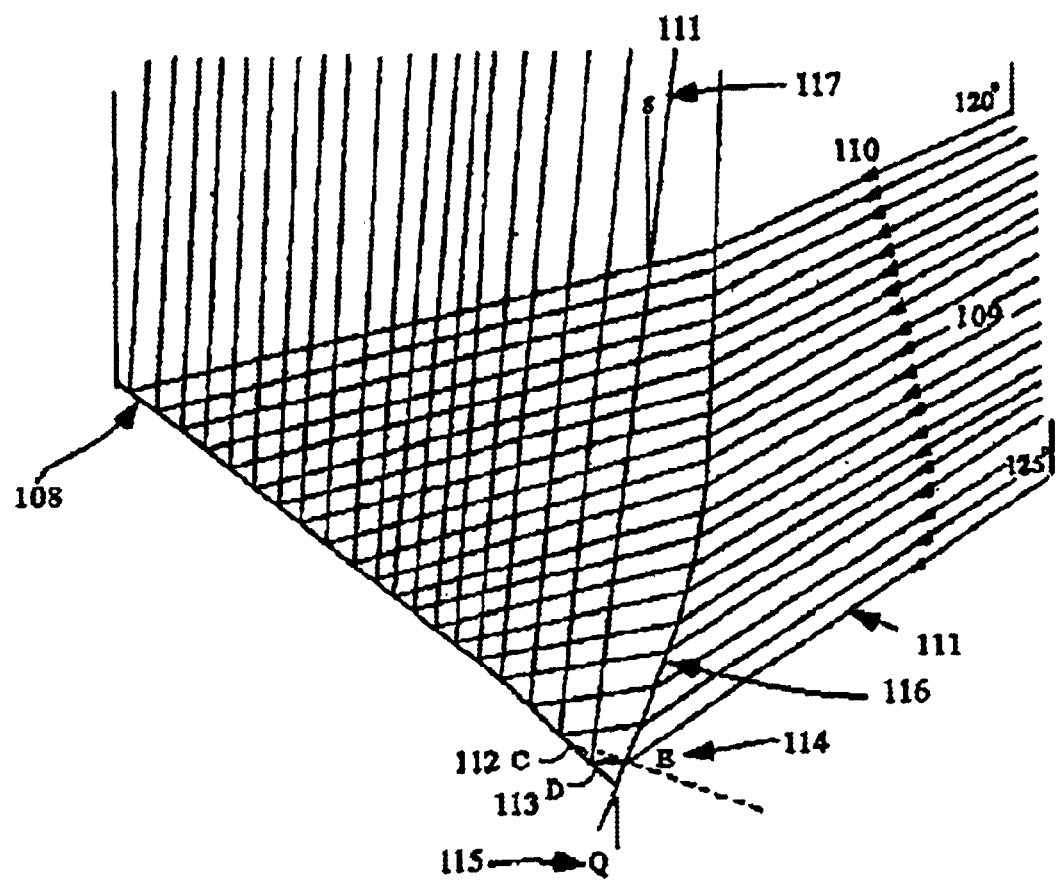
FIG. 10b shows a ray trace of the outermost facet of FIG. 10a, including pertinent angles.

Referring next to FIG. 10b, a ray trace of the outermost facet from FIG. 10a is shown. Shown are the total internal reflection face 108, ray fan 109, uppermost ray 110, lowest ray 111, complement to incidence angle C 112, internal angle D 113, external angle E 114, and inward tilt angle Q 115 of the Cartesian-oval entry face 116.

The maximum rim angle of a TIR lens is a function of the relative position of its outermost facet. The ray fan 109 is generated by a source placed at the focal point 102 of FIG. 10. The uppermost ray 110 has an angle 120° relative to the system axis 101 and is totally internally reflected at the top of TIR face 108. Lowest ray 111 has an angle 125°, and enters the facet 104 with an external angle E=125°−90°+, Q, where Q is the inward tilt of the Cartesian-oval entry face. This external angle E is refracted to internal angle D 113, followed by total internal reflection at TIR face 108, at incidence angle 90°−C 112 that must always be larger than the critical angle, $\sin^{-1} (1/n)$, for refractive index n.

Typically, the maximum practical deflection E-D is about 3°, while the deflection by the TIR face is much larger, 180°–2C. Ray 111 continues upward with inward angle S 117 (here 8°) from the system axis 101. Its originally downward course has been turned 132°, and it will be deflected even further when it exits the lens.

FIG. 10b depicts the ray trace for meridional rays, i.e., those in the plane of the paper. They are the only type in Type III circularly symmetric lens facets. For Type II lenses, however, the majority of rays are skew (out of the plane of the lens cross-section). Their Incidence angles, corresponding to external angle E in FIG. 10b, are greater, resulting in a smaller internal angle D and a smaller angle S. This only slightly widens the output beam over that of the circularly symmetric case of Type III.

Figure 11:
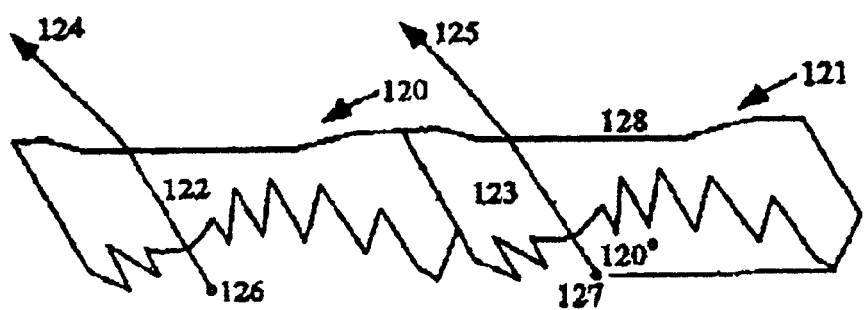
FIG. 11 is a cross-section of a pair of Type II asymmetric TIR lenses.

Referring next to FIG. 11, adjacent identical Off-Axis TIR lenses are shown. Shown are a left Off-Axis TIR lens 120, a right off-axis TIR lens 121, a left system axis 122, a right system axis 123, a left exemplary output ray 124, a right exemplary output ray 125, a left focal point 126, a right focal point 127, and a contoured exterior surface 128.

The adjacent identical left off-axis TIR lenses 120 and right off-axis TIR lenses 121 have the entirety of their interior faceting along with their symmetry axes 122 & 123 tilted while leaving the exterior surface 128 unmoved. The adjacent Identical left off-axis TIR lens 120 and right off-axis TIR lens 121 have a left system axis 122 and a right system axis 123 that are substantially tilted (28°) and parallel The refracted left output ray 124 and the refracted light output ray 125 are shown at about a 45° angle, a capability unprecedented in the prior art (as exemplified in FIG. 6). The source light lies at the left focal point 126 and the right focal point 127 of the lenses, so that large (120°) output rays 124, 125 are essential to this robustly tilted off-axis output. The exterior surface 128 is shown contoured to enhance uniformity, but could equally well be flat, or gradually curved for a conformal-lens application. This cross-section is equally applicable to linear (Type II) and circular (Type III) configurations.

For linear lenses, light-emitting diodes (LEDs) are situated on the focal line of the lens. If they are densely packed thereupon, they approximate a continuous source, so that the output of the linear lens is uncontained in the longitudinal direction. When there are fewer LEDs, however, their separation permits a cylindrical lens to be placed over each LED on the outer surface of the TIR lens, running perpendicular to the axis of the linear TIR lens beneath it.

The determining parameter is the ratio of LED separation to lens height. The greater the separation, the larger the fraction of the source's radiation will shine on each cylindrical lens. A cylindrical lens with the ratio S of half-width to height will collect the fraction $F=2(S/(1+S^2)+\tan^{-1}S)/B$.

Thus if $S=\frac{1}{2}$ then $F=0.55$, while for $S=1$, $F=0.82$, a majority of the output. The rest of the light will hit an adjacent cylindrical lens, either to be internally reflected or refracted far out of the main beam.

Figure 12:
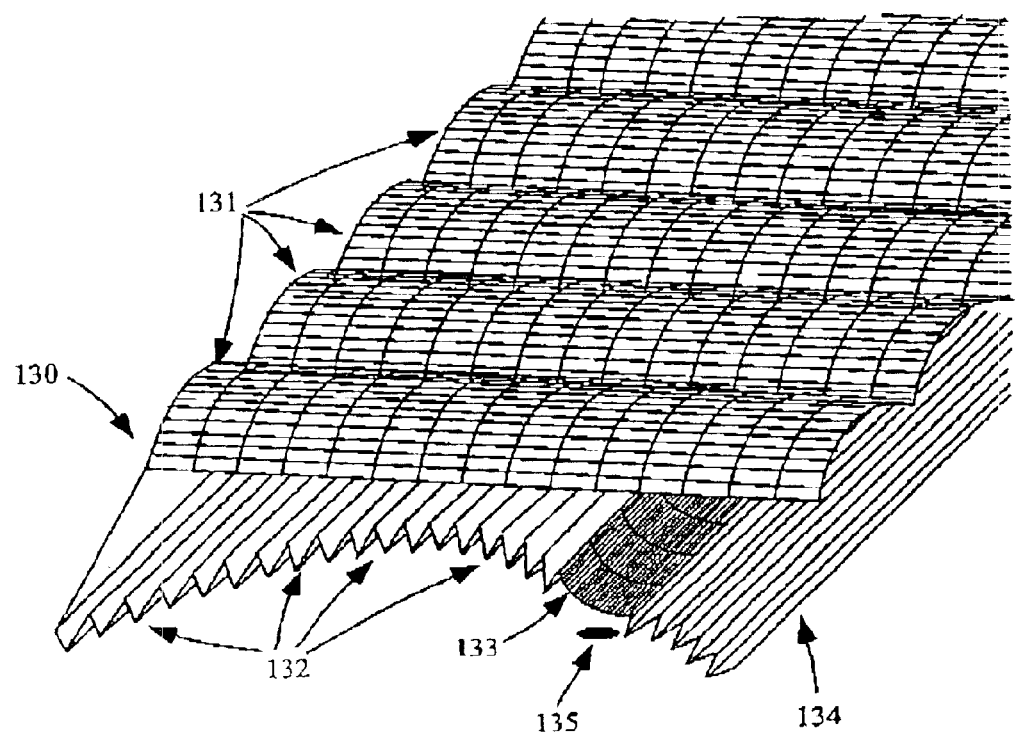
FIGS. 12, 12a and 12b depict an anamorphic Type II asymmetric TIR lens in various embodiments.
Figure 12A:
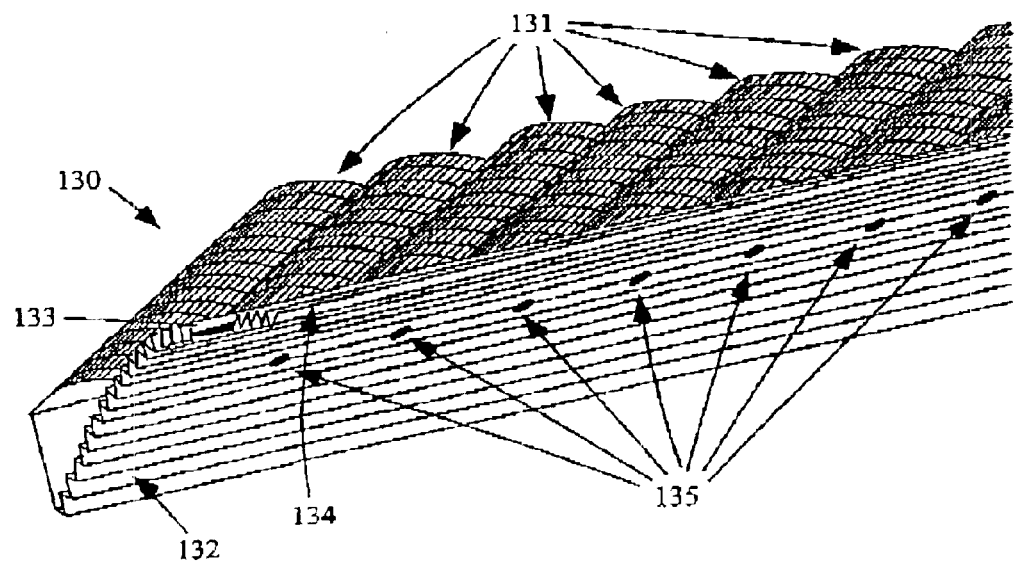

FIG. 12 depicts a cutaway view from above of anamorphic Type II linear TIR lens 130 with convex top-surface cylindrical lenses 131, left facets 132, a transverse cylindrical lens 133, right facets 134, and a Lambertian disc source 135, one of many on the focal line of TIR lens 130. Each source 135 radiates into the cylindrical lens over it, which gathers its light Into a longitudinally narrower pattern. Not shown are side or end walls, or the transparent medium of the lens. This lens is identical in form to that of FIG. 8, and will have its off-axis output beam slanted transversely to the right. FIG. 12a shows a view from below of the same lens, with multiple discrete sources 135, each at the center of a lens 131. Each source 135 has a corresponding convex lens 131 above it to gather skew rays and reduce their skewness to increase output intensity.

The disc sources shown here are schematic, representing any source producing only upward-going light, although such a Lambertian disc source is commercially available such as the Luxeon package from the Lumileds company.

Figure 12B:
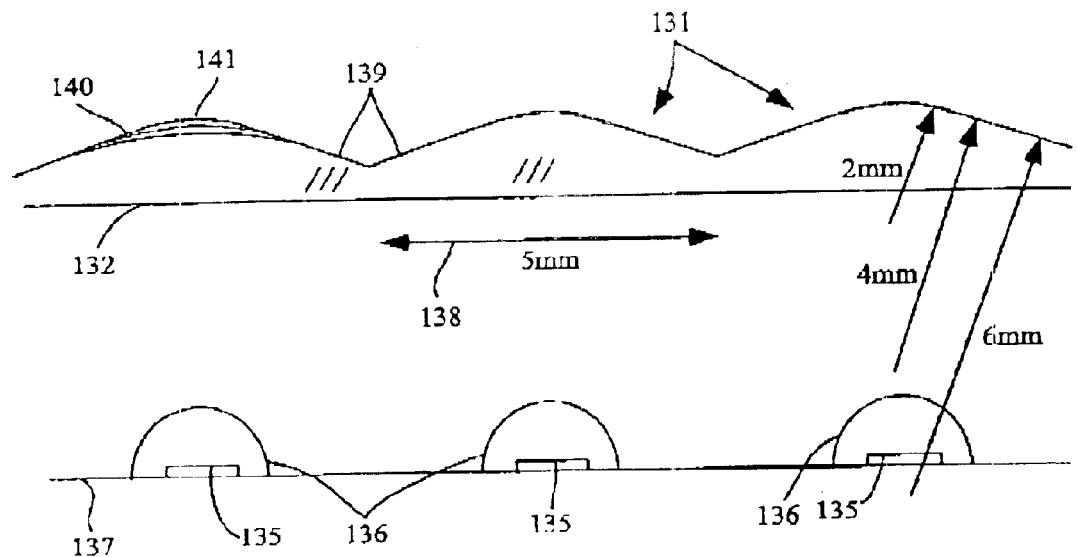

FIG. 12b shows a longitudinal cross-section of the same lens, with multiple sources 135 shown encapsulated in domes 136 on circuit board 137. Transverse lenses 131 are comprised of three lens-sections of different radii. Lower section 139 has radius of curvature of 6 mm, middle section 140 with 4 mm, and upper section 141 with 2 mm. The spacing of chips 135 equals lens width 138 of 5 mm. This particular combination of radii acts to fulfill the intensity prescription for automotive daytime running lights.

Figure 13:
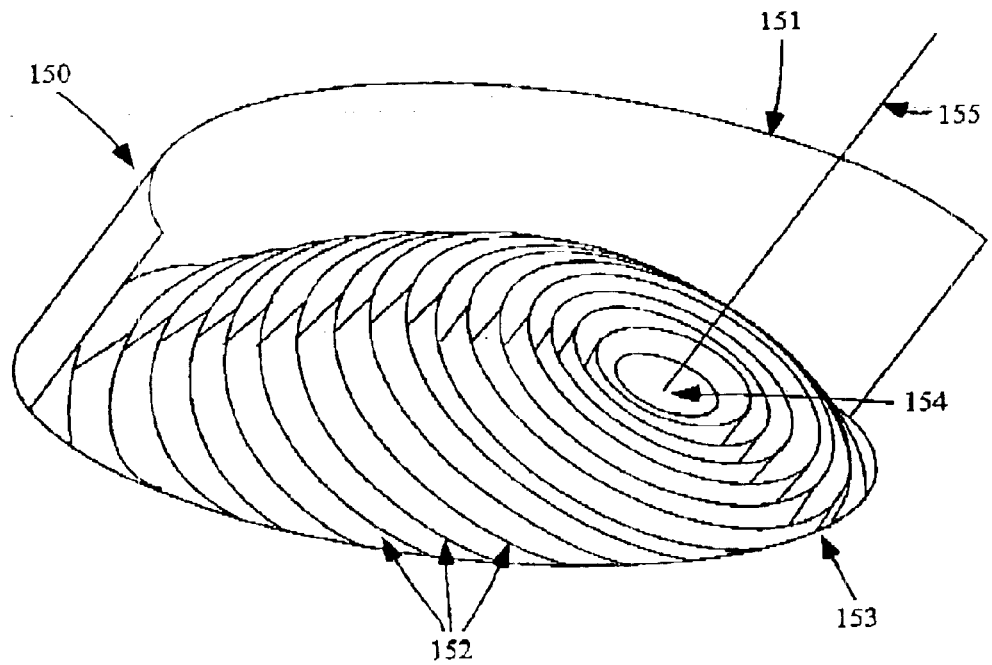
FIGS. 13 and 13a depict a Type III off-axis TIR lens.
Figure 13A:
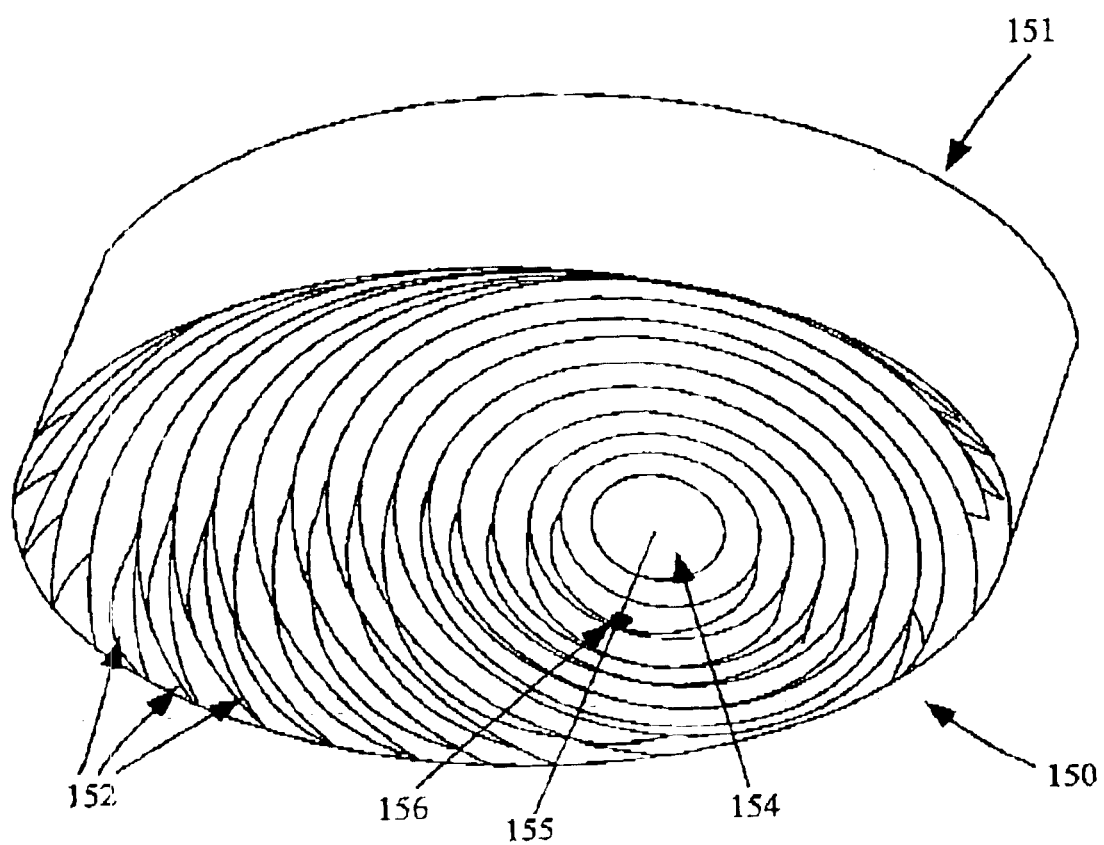

FIG. 13 depicts a cutaway view of Type III TIR lens 150, showing the elliptical-cylinder shape of cutaway sidewall 151. Facets 152 terminate at the bottom plane 153. Central lens 154 shares the tilt of system axis 155, which passes centrally through it, as well as through focal point 156. (FIG. 13a) It is readily apparent that construction of a mold for this lens would involve the customary rotational turning of the circular shape of the interior of facet grooves 152, then cutting away all material below plane 153. The cavity corresponding to elliptical-cylinder sidewall 151 could, of course, not be formed rotationally, unlike the case with the circular symmetry of prior-art on-axis TIR lenses. FIG. 13a shows the same lens 150 seen from below, with focal point 156 shown as located on system axis 155, which passes centrally through convex central lens 154, but with bottom plane 153 removed for clarity. Faceted grooves 152 can be seen to have circular symmetry about axis 155.

The optical action of lens 150 is the same as for lens 80 in FIG. 8. Rays from the source will propagate out to the lens facets, to be redirected into a slanted beam that is refracted by the top surface into a greater external slant.

What is claimed is:

1. A tilted-beam illumination lens system, comprising:
   a smooth upper surface; and
   a lower surface comprising a plurality of deflective facets deployed asymmetrically about an axis tilted from the surface normal of said upper surface, said lower-surface facets receiving light from a common focal zone and forming a beam therefrom, said beam propagating upward within the body of said lens along said tilted axis, said beam exiting said upper surface with a net deflection angle relative to said surface normal of said smooth upper surface, said deflective facets comprising both refractive and totally internally reflecting facets.

2. The system of claim 1 wherein said deflection angle is 30° or more.

3. The system of claim 1 wherein positioned within said focal zone are one or more light-emitting diodes.

4. The system of claim 1 wherein said system is for use on a vehicle.

5. The system of claim 1 wherein said smooth upper surface has curvature conformal with that of the surface onto which said system is installed, and said deflective-facets act to counter said curvature to produce substantially parallel rays exiting said upper surface.

6. The system of claim 1 wherein said deflective facets are linear grooves with transverse deflection, and said focal zone is a linear strip.

7. The system of claim 6 wherein said transverse deflection of said plurality of longitudinal facets is the same on both sides of said focal zone.

8. The system of claim 6 wherein said focal strip bears a multiplicity of point sources.

9. The system of claim 8 wherein said external surface comprises a plurality of transverse cylindrical lenses in correspondence with said point sources.

10. The system of claim 9 wherein each of said transverse cylindrical lenses comprises multiple radii of curvature.

11. The system of claim 1 wherein said deflective facets are circular grooves with a central focal zone and a tilted axis of rotational symmetry.

12. The system of claim 11 wherein said circular grooves comprise a TIR lens with rim angle greater than 90°, said tilted axis bringing said rim angle level with said focal zone.

13. A tilted-beam illumination lens, comprising:
a smooth upper surface; and
a lower surface having a first half and a second half, wherein said first half is a converging TIR lens and said second half is a diverging TIR lens, said converging TIR lens and said diverging TIR lens having a plurality of deflective facets, each of said facets having the same output angle such that said first and second halves form a beam substantially off-axis relative to the surface normal of said smooth upper surface.

14. The lens of claim 13 wherein said deflection angle is 30° or more.

15. The lens of claim 13 wherein said lens is for use on a vehicle.

16. The lens of claim 13 wherein said smooth upper surface has a curvature conformal with that of the surface onto which said lens is installed.

17. A tilted-beam Illumination lens, comprising:
a smooth upper surface; and
a lower surface comprising a plurality of deflective facets having a bilaterally symmetric TIR lens profile wherein said TIR lens profile is titled relative to the surface normal of said smooth upper surface; and
a rim angle greater than 90° such that said lens forms a beam substantially off-axis relative to the surface normal of said smooth upper surface.

18. The lens of claim 17 wherein said deflection angle is 30° or more.

19. The lens of claim 17 wherein said lens is for use on a vehicle.

20. The lens of claim 17 wherein said smooth upper surface has a curvature conformal with that of the surface onto which said lens is installed.

21. A method of redirecting radiant energy, comprising the steps of:
situating a lens on a body, wherein said lens has a smooth upper surface and a lower surface having a plurality of deflective facets, wherein said facets are both refractive and totally internally reflecting; and
deploying said plurality of deflective facets asymmetrically about an axis tilted from the surface normal of said upper surface; and
receiving light from a common focal zone; and
forming a beam of light from said lower surface; and
transmitting said beam of light with a net deflection angle relative to said surface normal of said smooth upper surface.

22. The method of claim 21 wherein said body is a vehicle.

23. The method of claim 21 wherein said deflection angle is 30° or more.

24. The method of claim 21 wherein said smooth upper surface has a curvature conformal with that of the surface onto which said lens is installed.

* * * * *

UNITED STATES PATENT AND TRADEMARK OFFICE
CERTIFICATE OF CORRECTION

PATENT NO. : 6,924,943 B2
DATED : August 2, 2005
INVENTOR(S) : Minano et al.

It is certified that error appears in the above-identified patent and that said Letters Patent is hereby corrected as shown below:

Column 10,
Line 62, between "deflective" and "facets" delete "-" (hyphen).

Column 11,
Line 9, delete "claim 9" and insert -- claim 8 --.

Signed and Sealed this

First Day of November, 2005

JON W. DUDAS
*Director of the United States Patent and Trademark Office*